United States Patent
Duchesne et al.

(10) Patent No.: US 7,484,190 B1
(45) Date of Patent: Jan. 27, 2009

(54) METHOD TO OPTIMIZE THE MANUFACTURING OF INTERCONNECTS IN MICROELECTRONIC PACKAGES

(75) Inventors: Eric Duchesne, Granby (CA); Julien Sylvestre, Chambly (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/103,227

(22) Filed: Apr. 15, 2008

(51) Int. Cl.
*G06F 17/50* (2006.01)

(52) U.S. Cl. .............................. 716/4; 716/10; 716/13; 716/15

(58) Field of Classification Search .............. 716/4, 716/10, 13, 15
See application file for complete search history.

(56) References Cited

U.S. PATENT DOCUMENTS

| 5,694,344 | A | 12/1997 | Yip et al. |
| 6,188,582 | B1 | 2/2001 | Peter |
| 7,257,796 | B2 | 8/2007 | Miller et al. |
| 2003/0182647 | A1* | 9/2003 | Radeskog ............. 716/8 |
| 2004/0115409 | A1 | 6/2004 | Sterrett et al. |
| 2006/0015836 | A1* | 1/2006 | Curtin et al. ......... 716/10 |
| 2008/0046850 | A1* | 2/2008 | Curtin et al. ......... 716/6 |

FOREIGN PATENT DOCUMENTS

| JP | 2004310381 A | * | 11/2004 |
| SU | 1714473 A1 | * | 2/1992 |

OTHER PUBLICATIONS

Kitano et al. "Shape Prediction of Solder Bump Joint by Surface Tension Analysis and fatigue Strength Evaluation," ASME Advances in Electronic Packaging, 1997, EEP, vol. 19-2, pp. 1407-1413.
Anbe, Yoshinobu, "Surface Tension Effects on the Solder Joint," International Conference on Electronic Assembly Material and Process Challenges, 1996, pp. 1106-1 to 1106-8.

* cited by examiner

*Primary Examiner*—Phallaka Kik
(74) *Attorney, Agent, or Firm*—King & Spalding LLP

(57) ABSTRACT

A method for optimizing the manufacturing of interconnects in microelectronic packages in the presence of sources of process variability. The method can estimate the contribution of multiple parameter to the quality of the interconnects, enabling the optimization of the manufacturing process.

1 Claim, 2 Drawing Sheets

METHOD TO OPTIMIZE THE MANUFACTURING OF INTERCONNECTS IN MICROELECTRONIC PACKAGES

FIELD OF THE INVENTION

This invention relates to integrated circuit packaging, and in particular to the formation of interconnects between a semiconductor product, such as a packaged integrated circuit (IC), and a substrate, such as a printed circuit board (PCB).

BACKGROUND

Modern microelectronic packages such as flip-chip ball grid array (FCBGA) packages may include several hundred closely spaced interconnects, formed as solder joints distributed over the entire area of the integrated circuit (IC). Each interconnect includes a solder bump which connects a pad located on the IC with a corresponding pad on a substrate. Known substrates include for example printed circuit boards (PCBs) formed from organic laminates, and ceramic substrates.

Interconnects must be formed by a process that is both defect-free and reliable over the long term. A first type of defect that may be present immediately after manufacturing is an open circuit, for example due to the fact that a solder bump is too small to contact both the pad on the IC side and the pad on the substrate side. Another type of defect is a lateral short ("bridge") between adjacent interconnects. Moreover, interconnects must be reliable over the lifetime of a product, which may be of the order of 10 years. This requires the interconnects to have a shape and structure that can withstand long-term thermal cycling without mechanical failure.

Forming defect-free and reliable interconnects between an IC and a substrate is difficult, in part because of the high variability in many critical parameters, such as the planarity of the substrate, the volume of solder bumps, IC alignment, etc. Accordingly, there is a need for a method to optimize the manufacturing of interconnects in the presence of many sources of variability.

SUMMARY OF THE INVENTION

In one embodiment, the invention provides a method of computing quality metrics of an assembly, the assembly including a packaged integrated circuit (IC), a substrate, and a plurality of interconnects joining the IC and the substrate, each interconnect being characterized by a plurality of parameters. The method may comprise the steps of: (a) pre-calculating restoring forces for each interconnect in a fluidic state as a function of the plurality of parameters; (b) generating an initial set of parameters for each interconnect from predetermined joint probability distributions; (c) generating an initial position of the IC; (d) computing restoring forces for each interconnect by interpolating pre-calculated restoring forces based on the position of the IC and on the set of parameters; (e) computing net forces and moments on the IC based on the restoring forces; (f) testing whether convergence has been reached by comparing the absolute value of each of the net forces and moments with a corresponding predetermined tolerance; (g) if convergence has not been reached, updating the position of the IC based on the net forces and moments, and repeating steps (d) through (g); and (h) computing quality metrics based on the position of the IC and the parameters of the plurality of interconnects.

BRIEF DESCRIPTION OF THE DRAWINGS

Embodiments of the invention will now be described with reference to the appended drawings in which.

Drawings are only diagrammatic and not to scale. Corresponding elements in different drawings are indicated by the same numerals.

DETAILED DESCRIPTION

Figure 1:
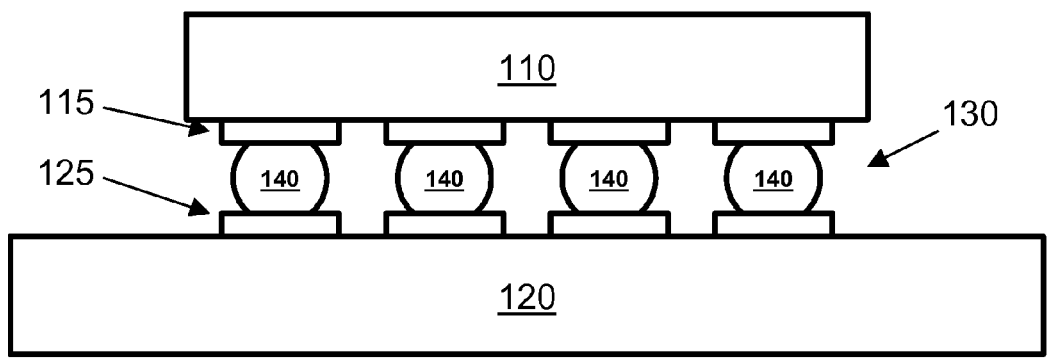
FIG. 1 shows a side view of a prior art integrated circuit and printed circuit board to which embodiments of the invention may be applied.

FIG. 1 shows a side view of a prior art integrated circuit and printed circuit board to which embodiments of the invention may be applied. The integrated circuit 110 is positioned over a substrate 120. The integrated circuit 110 includes pads 115 and substrate includes pads 125. Pads 115 and 125 are connected by interconnects 130 formed by melting and then solidifying solder bumps 140, thus forming solder joints. While the drawing only shows four interconnects aligned in a row, industry-standard ICs include hundreds of interconnects, typically arranged in a matrix over the entire surface of the IC.

The physical parameters of the process of forming solder joints depend partly on the type of solder used. Typically, a temperature sufficient for the solder to undergo a transition to the liquid phase is required for reliable formation of interconnects. For example, traditional eutectic tin-lead solder (Pb 37%, Sn 63%) has a melting point of 183° C. The transition toward lead-free packaging requires the adoption of different solders, for example Sn 96.5%, Ag 3.5%, which melts at 221° C; Sn 95%, Sb 5%, which melts at 245° C; and Sn 43%, Bi 57%, which melts at 139° C. The embodiments of the invention described below generally apply to the analysis of interconnects in their fluidic state, i.e., such that the forces normally present during the interconnect formation are sufficient to displace an IC by a technologically significant amount during the typical duration of an interconnect formation process (i.e., seconds or minutes).

Figure 2:
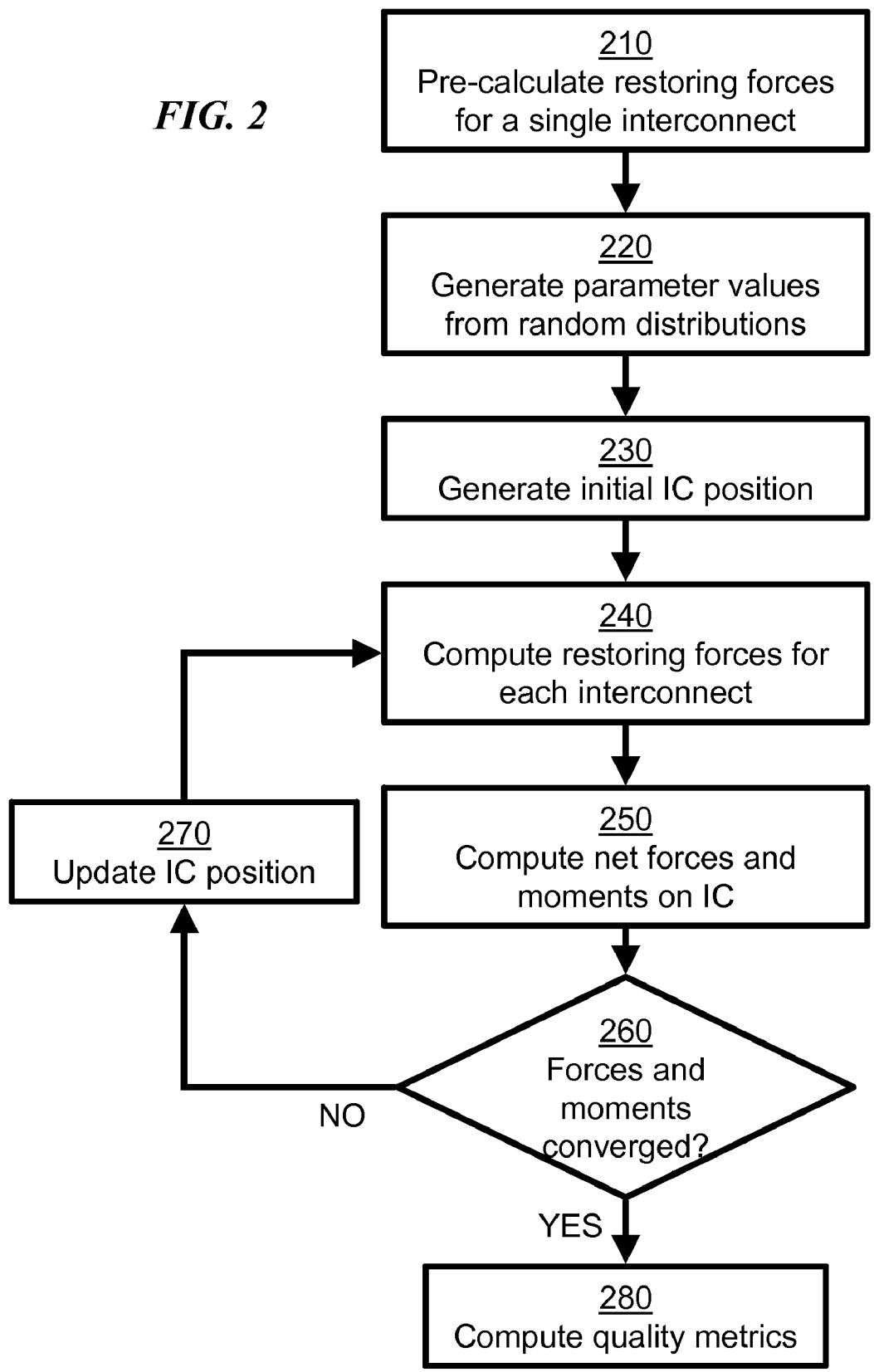
FIG. 2 shows a flow chart representing an analysis procedure in an embodiment of the invention.

FIG. 2 shows a flow chart representing an analysis procedure in an embodiment of the invention. While several steps are shown as taking place in a specific sequence, it will be apparent that the order of many of the steps may be changed without affecting the operation of the method. The method may be carried out by any combination of hardware and software, including fully dedicated hardware, and/or software running on a general-purpose computer.

The method may begin at step 210, which involves the pre-calculation of restoring forces for a single interconnect in a fluidic state. At this step, force values may be calculated for interconnects with various values of: solder bump height and volume, pad diameters, pad locations, pad orientations, surface tension, pad shapes, etc. This can be done using standard methods which allow the detailed three-dimensional analysis of an interconnect in a fluidic state. An example of a software package capable of such calculations is The Surface Evolver, which is available free of charge from Susquehanna University, Selinsgrove, Pa. (http://www.susqu.edu/facstaff/b/brakke/evolver/evolver.html) Alternatively, values of the restoring forces may be obtained from experimental results and stored in a look-up table.

During the pre-calculation step, a large number of values may be calculated and stored in a look-up table implemented as any known form of storage medium. In general, the more values are pre-calculated, the more efficient and accurate the subsequent analysis will be. The pre-calculation step, however, is not strictly necessary, and values of restoring forces may also be performed "on demand" during subsequent steps of the analysis. Such on-demand calculation of restoring forces always guarantees the highest available accuracy at the expense of a higher computational cost. However, in some particular cases, on-demand calculation may even be more efficient if computational power is more readily available than storage space. In some embodiments of the invention, a mix of pre-calculation and on-demand calculation of restoring forces may also be employed. For example, the analysis may use pre-calculated values at the beginning, and switch to on-demand calculation during the last phase of the analysis where higher accuracy may be required.

At step 220, parameter values may be generated for the interconnects from random distributions. These interconnects form the "interconnect matrix" on which the IC is floating. The parameters characterizing each interconnect may include, for example, solder bump volume, pad diameters, pad locations, pad shapes, etc. The parameters generated at step 220 may be less numerous than the parameters used in the pre-calculation of restoring forces at step 210. For example, the full set of parameters may include the solder bump height (i.e., the distance between the IC pads and the substrate pads), which is not an inherent property of an interconnect but will be updated during the analysis process as the position of the IC is updated, as further discussed below. Therefore the bump height may be excluded from the set of parameters that are generated at step 220.

The parameters are generated at step 220 starting from probability distributions which may be known in advance, for example from experimental measurements or theoretical models. Random variables with a predetermined probability distribution may be generated, for example, by a rejection method, as described in Press et al., *Numerical Recipes in C* (2d ed. 1992), at 290-91. Note that in general the probability distributions for the various parameters may not be independent. For example the volume of a solder bump may exhibit a dependence on the location of the solder bump on the IC area, due to spatial non-uniformities in the process that applies the solder to the pads. If such correlations exist they may be taken into account during the generation of the interconnect parameters at step 220, by generating variables from joint probability distributions. Random variables with known correlation may also be generated by known methods, such as a rejection method, as discussed above.

At step 230, the position of the IC may be initially assigned to some arbitrary value. As this is only used as an "initial guess" for the subsequent analysis, the exact value of the IC position is not crucial to the operation of the method. However, a bad initial guess may slow down convergence of the method. Therefore it may be advantageous to choose an initial position as close as possible to a realistic position of the IC. For example, one could initially position the IC parallel to the substrate at a distance equal to the typical height of a solder bump. Even better results may be obtained from the use of heuristic methods accounting for the specific distribution of random interconnect parameters.

While steps 210, 220 and 230 are shown as occurring in the specific sequence described above, they are essentially independent from each other and may be carried out in any other sequence, or even in parallel if the system implementing the method has such parallel processing capability.

At step 240, the restoring forces may be computed for each interconnect, for a specific position of the IC with respect to the substrate. For example, the values of the restoring forces pre-calculated at step 210 may be interpolated for each interconnect in the interconnect matrix. The interpolation may combine one or more pre-calculated data points for the restoring forces to obtain a satisfactory approximation of the actual restoring force at a given interconnect. The interpolation may be carried out by any known method. As mentioned above, a larger number of pre-calculated values of the restoring forces will result in a more accurate interpolation. Alternatively, the restoring forces may be computed "on demand" for each interconnect without relying on pre-calculated values. This method is more accurate but may also be computationally more expensive.

At step 250, the net forces and moments on the IC may be computed. This may be done by combining all the contributions from the restoring forces previously obtained for each interconnect. For example, a total of three forces and three moments may be calculated, one for each of the directions X, Y and Z, where X and Y lie in the plane of the substrate and Z is the direction perpendicular to the substrate.

At step 260, the convergence of the forces and moments may be tested. The test for convergence may be met when the absolute values of all moments and forces fall below some threshold value or tolerance. Since moments and forces are dimensionally different physical quantities, the tolerance may be numerically different for the forces and the moments. Also, different tolerances may be employed for the X, Y and Z components of the forces and moments. In general, the smaller the tolerances, the more accurate the result will be, but also the more computationally expensive the analysis will be. As regards forces in the Z (vertical) axis, the weight of the IC itself must be taken into account in the calculation. Of course if the orientation of the substrate is not horizontal, the weight of the IC will also be distributed on the X and Y directions.

If no convergence has been reached at step 260, the method may move on to step 270 and update the IC position by translating and rotating the IC in a direction that is calculated from the net forces and moments acting on the IC. The update may be performed with the goal of achieving stable convergence of the method in a short number of iterations. For example, the update may be calculated from physical considerations, assuming that the IC is placed in a viscous medium and computing the changes in the IC's position over a short period of time, or time step. In practice, this may be equivalent to simply displacing the IC by an amount proportional to the net force, and rotating it by an amount proportional to the net moment. The proportionality factors for the displacement and rotation may be set empirically, starting from relatively large values and decreasing the factors until the algorithm reaches convergence. Alternatively, purely numerical methods may be used to iteratively find the position corresponding to zero forces and moments, such as the iterative method described in Press et al., *Numerical Recipes in C* (2d ed. 1992), at 379-83. After the IC position has been updated, the method goes back to step 240 and proceeds as discussed above.

If convergence has been reached at step 260, the method may proceed with step 280 and compute quality metrics which may be used, for example, to refine the manufacturing process. Quality metric may include the minimum distance between two neighboring interconnects, which is related to the risk of forming "bridges" during the IC joining process.

Quality metrics may also include the shape of the interconnects, since highly distorted interconnects are generally more prone to mechanical failure.

Both the generation of the parameter values at step 220 and the calculation of the restoring forces at step 240 may be performed independently for each interconnect, or in "clusters" of several interconnects. Clustering may be allowed, for example, by the symmetry of the pad distribution in the IC, and may afford a substantial reduction of computation times. For example, if only a quarter of an IC is modeled, the calculation of restoring forces will proceed approximately four times faster than if the full interconnect is modeled. However, even for a symmetric IC, clustering may also reduce the ability of the method to correctly predict the behavior of actual PFBGA packages, since it may not be able to capture some rotational effects and/or asymmetries which may be due, for example, to random process variations.

The embodiment of the invention illustrated in FIG. 2 has the advantage that the full interconnect matrix model is relatively fast to build, and it can use parameters drawn from random distributions, thus reflecting the variability of the manufacturing process. This approach may be particularly useful to incorporate couplings between various parameters, for instance between substrate co-planarity and mean interconnect height. This embodiment of the invention thus provides a method capable of estimating the contribution of multiple parameter to the quality of the interconnects, enabling the optimization of the manufacturing process.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

While the invention has been described in conjunction with specific embodiments, it will be appreciated that such embodiments are not limiting. Accordingly, numerous alternatives, modifications, and variations are possible within the scope of the appended claims.

We claim:

1. A method of computing quality metrics of an assembly, the assembly including a packaged integrated circuit (IC), a substrate, and a plurality of interconnects joining the IC and the substrate, each interconnect being characterized by a plurality of parameters, the method comprising:
   (a) pre-calculating restoring forces for each interconnect in a fluidic state as a function of the plurality of parameters;
   (b) generating an initial set of parameters for each interconnect from predetermined joint probability distributions;
   (c) generating an initial position of the IC;
   (d) computing restoring forces for each interconnect by interpolating pre-calculated restoring forces based on the position of the IC and on the set of parameters;
   (e) computing net forces and moments on the IC based on the restoring forces;
   (f) testing whether convergence has been reached by comparing the absolute value of each of the net forces and moments with a corresponding predetermined tolerance;
   (g) if convergence has not been reached, updating the position of the IC based on the net forces and moments, and repeating steps (d) through (g); and
   (h) computing quality metrics based on the position of the IC and the parameters of the plurality of interconnects.

* * * * *